United States Patent [19]

Suezawa et al.

[11] 3,727,631
[45] Apr. 17, 1973

[54] VALVE FOR PRESSURE INDICATORS

[76] Inventors: Tadaaki Suezawa, 1-1, Tama 3-chome, Tamano; Tohru Suzuki, 25, Susanodori 1-chome, Hyogoku, Kobe, both of Japan

[22] Filed: Sept. 20, 1971

[21] Appl. No.: 181,927

[52] U.S. Cl. .......137/243.2, 137/243.3, 137/625.27
[51] Int. Cl. ..............................................F16k 11/04
[58] Field of Search................137/625.27, 625.25, 137/331, 243.2, 243.3; 251/176

[56] References Cited

UNITED STATES PATENTS

| | | | |
|---|---|---|---|
| 194,321 | 8/1877 | Bailey | 137/625.27 |
| 1,711,593 | 5/1929 | Gilbert | 137/243.2 |
| 3,272,218 | 9/1966 | Johnson | 137/625.25 X |
| 817,535 | 4/1906 | Walsh, Jr. | 137/625.27 X |
| 831,677 | 9/1906 | Noone | 137/625.27 X |
| 1,142,145 | 6/1915 | Collar | 137/243.3 |
| 1,114,995 | 10/1914 | Langley et al. | 137/243.3 |

Primary Examiner—Henry T. Klinksiek
Assistant Examiner—Robert J. Miller
Attorney—David H. Semmes

[57] ABSTRACT

A valve, of which valve disk can be pressed and rotated extra firmly against a main valve seat, against leakage and obstructive combustion residues thereat, by resilient force of a compression type coil spring mounted between a value bonnet and a spindle guide holding the spindle with screwed inner surface and can move axially for a range, also having a draught chamber which co-ordinates with an upper valve seat in letting out residual pressure inside a pressure indicator, and further having a ventilation opening on the side of the bonnet against corrosion of the coil spring.

3 Claims, 1 Drawing Figure

PATENTED APR 17 1973 3,727,631
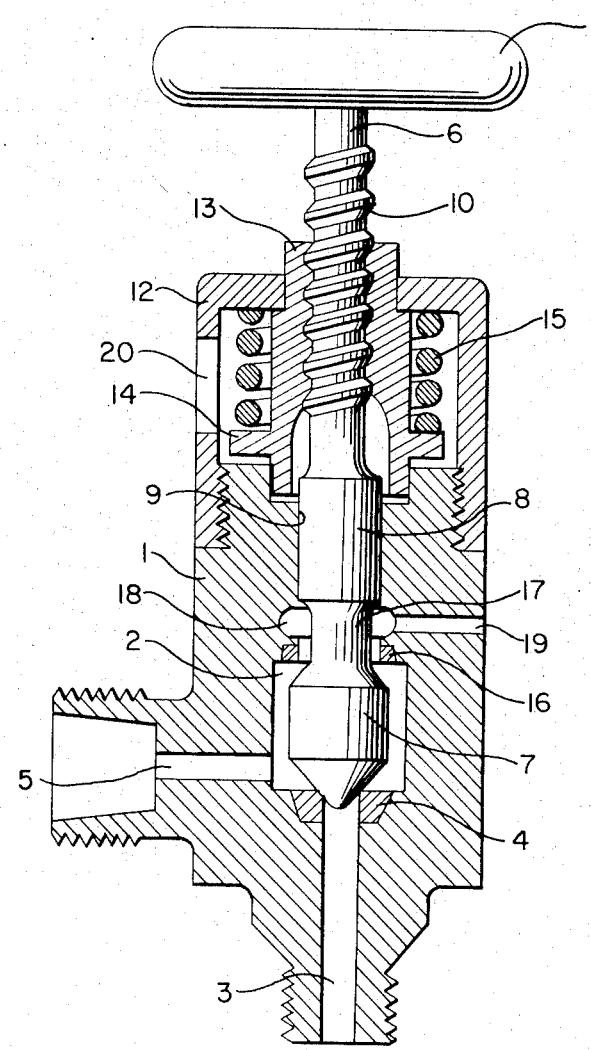
INVENTORS
TADAAKI SUEZAWA
TOHRU SUZUKI
DAVID H. SEMMES
ATTORNEY

VALVE FOR PRESSURE INDICATORS

BACKGROUND OF THE INVENTION

The present invention relates to a valve for pressure indicator used in measuring internal pressure of diesel engines.

Aboard large sized ships, generally, regular inspection and recording of the diesel engines' performance and relative conditions have become customary procedures practised at designated time throughout their voyages. For this inspection, valves mounted on the engine's head-cover are manually handled to conduct the engine's internal pressure, namely, combustion gas pressure, into a pressure indicator.

The combustion gas above-mentioned is highly corrosive with high thermal pressure, and also contains combustion residues such as carbon as well. In this connection, the valves of prior art equipped with valve spindles which merely move up and down therein have had an undesirable possibility of leaks because the combustion residues, caught in-between the valve head and the corresponding valve seat, have made it difficult to shut the valve completely.

On the other hand, the engine's internal pressure, of which measured readings require high degree of precision and accuracy for computing its horse power so indicated, checking its performance and relative conditions, etc., repeats acute pressure fractuation. With the prior art valves, any residual pressure which tends to linger in the pressure indicator gives inaccurate pressure readings, thereby making the pressure data low in reliability and leading to mistaken judgement of the engine's performances.

The present invention is designed to prevent the disadvantages such as mentioned above.

SUMMARY OF THE INVENTION

It is an object of the present invention to provide a new and improved valve, wherein a valve spindle is so designed to revolve rotatively while in contact under pressure with a valve seat in order to dispose of any combustion residues which may accumulate in-between a valve disk and said valve seat and also to prevent leakage of combustion gas to be measured by fitting said valve disk and valve seat for a tight sealing.

It is another object of the present invention to provide a new and improved valve, wherein all residual pressure within a pressure indicator, coupled with the valve, is readily removed through a residual gas outlet dug out in the valve's casing in order to consistently obtain most accurate readings on the pressure indicator anytime.

With the above and other objects in view, in accordance with the present invention, a valve has a spindle having a valve disk part which moves within a valve chest axially and can be pressed securely tight and rotated against valve seats, and an intermediate rubbing part and a neck screwed part. It further comprises a cap-nut type bonnet, screwed onto the valve casing, covering a spindle guide which embraces the spindle's screwed part and helps the spindle head's opening and shutting action with the help of resilient force of a compression type coil spring, which holds the spindle guide against the bonnet ceiling. The valve, beside the main valve seat, is also equipped with an additional valve seat, which opens and connects a passage, in co-ordination with the motions of the valve disk, for residual pressure in the pressure indicator to the atmosphere through a draught chamber directly above thereof and an exhaust hole provided in the casing. The invention also provides an opening for ventilation of the interior of the bonnet against corrosion of the compression spring therein.

The invention will be better understood from the following description taken in connection with the accompanying drawing.

BRIEF DESCRIPTION OF THE DRAWING

The accompanying drawing, FIG. 1, is a longitudinal cross-sectional view of an indicator valve in accordance with a preferred embodiment of the present invention.

DETAILED DESCRIPTION OF THE INVENTION

In FIG. 1 is shown a valve casing 1 having therein a valve chest 2, a fluid intake opening 3 running from the bottom of the valve casing 1 to be mounted to a head-cover of an engine through said valve chest 2 for taking in combustion gas to be measured, a main valve seat 4 provided at the upper end of said fluid intake opening 3, a fluid outlet 5 to be coupled with a pressure indicator for the fluid lead out from a side of the valve chest 2, and a valve spindle 6.

The valve spindle 6 has a valve disk 7 at the bottom thereof and can come into and disconnect contact with the valve seat 4 for opening and closing the fluid intake by shifting up and down by manual turning of a handle 11 mounted at the uppermost part thereof, an intermediate rubbing surface 8 mounted so as to move axially up and down along the inner wall 9 of the valve casing's central cylindrical hole, and an upper part forming an axial screw 10.

Further, the top part of the valve casing 1 is screwed together with a cap-nut type bonnet 12, in which a spindle guide 13, holding the spindle's screw part with its screw surfaced inner wall, by the resilient force of a compression coil type spring 15 fitted in-between a colar 14 at the lower part of the spindle guide 13 and the top cover of the bonnet 12. The spindle guide is allowed to move axially to its uppermost point, wherein its upper middle part's shoulders reach the inner ceiling of the bonnet 12, and to its lowermost point, wherein the bottom face of the colar 14 comes into contact with the corresponding top surface of the valve casing 1.

Furthermore, at the ceiling of the valve chest 2 around the bottom of the axial cylindrical inner wall 9 of the middle part of the casing 1 is found an additional valve seat 16, the inner diameter of which is smaller than the outer diameter of valve disc 7 at its upper brim, enabling the upper shoulder of the valve head 7 to come into and disconnect contact therewith.

A part 17 of the valve rod in-between the valve head 7 and the intermediate rubbing part 8 is made smaller in its outer diameter than the additional valve seat 16 in its inner diameter. Right above the additional valve seat 16 is a draught chamber 18, open to the atmosphere through an exhaust hole 19 dug out on the casing 1.

The bonnet 12 has a side ventilation opening 20 in order to connect the inside of the bonnet 12 with outside air.

Now, as to the actual use of a pressure indicator along with the present invention, the drawing shows the valve being shut, the valve disk 7 pressing against the main valve seat 4, whereby the closed fluid intake opening 3 prevents combustion gas from flowing into the valve chest 2 and, therefore, the pressure indicator to be connected with the valve chest 2 through the fluid outlet 5 is not in a measurable state.

Meanwhile, the valve disc 7, not being in contact with the additional valve seat 16, allows the valve chest 2 to be in touch with the exhaust hole 19 via the draught chamber 18, whereby the gas remaining within the pressure indicator is lead out of the valve via the fluid outlet 5, valve chest 2, draught chamber 18 and exhaust hole 19, with the result that the inner pressure of the indicator is made equivalent to the atmospheric pressure. This makes it possible for the pressure indicator to give accurate readings every time absolutely free from any possible influence of the left-over pressure therein for obtaining required measuring data of ample reliability.

Further, under the illustrated state of the valve being closed, the spindle guide 13 is shown at its maximum up-limit with its shoulders in contact with the ceiling of the bonnet 12 and the compression coil spring 15 in the compressed state, wherein the valve disk 7 is found pressed, by force of resiliency of said compressed spring 15, sufficiently against the main valve seat 4.

In this state, by a selected twist of the valve handle 11, we are able to get a selected contacting force between the valve disk 7 and the valve seat 4 by the corresponding resiliency of the spring 15, so as to prevent any loosening of the spindle 6 or any leakage of fluid, even in such a case as the valve is under thermal load or vibration force.

For opening the closed valve, the handle 11 has to be turned counter-clockwise, whereby the axial screw 10 revolves, pushes the spindle guide 13 first from the maximum up-limit down to the maximum down-limit and comes to a stop, the spindle guide 13 being pressed against the uppermost end of the valve casing 1 by the resiliency of the spring 15. At this moment, the valve spindle 6 starts to rise upwardly, the valve disk 7 thereof being parted from the main valve seat 4 and contacting the upper valve seat 16.

In this open state of the valve, the valve chest 2 is connected with the fluid intake opening 3 and separated from the exhaust hole 19, which results in the combustion gas flowing through the fluid outlet 5 into the pressure indicator for measuring the internal pressure of an engine to be measured without leaking through exhaust hole 19 into the atmosphere. As mentioned earlier, absence of any gas remaining in the pressure indicator assures accurate pressure readings all the time.

For shutting the valve after the required measuring has been completed, the handle 11 has to be turned clockwise, whereby the axial screw 10 revolves, pushes the valve disk 7 down from the additional valve seat 16 until the valve disk 7 comes in contact with the main valve seat 4. With further strong turns of the handle 11 in the same direction, the valve spindle 6 revolves with its valve disk 7 rubbing against the main valve seat 4, while the axial screw 10 revolves and pushes the spindle guide 13, which has been securely in contact with the upper-most end of the valve casing 1 by means of resilient force of the compression spring 15, from the maximum down-limit up to the maximum up-limit overpowering the resilient force of the compression spring 15, whereby the valve returns to the closed state as illustrated in the drawing.

Therefore, as the valve is closed, the valve disk 7 is made to revolve while being pressed against the main valve seat 4 by the resilient force of the compression spring 15 in a fitting fashion. This fitting movement can grind and dispose of any combustion residues such as carbon contained in the combustion gas which may adhere to the upper face of the main valve seat 4, and with ample pressed contact is also capable of keeping out leakage which might otherwise take place by the valve's taking in the combustion residue in-between the valve head 7 and the main valve seat 4.

Also in order to counteract a phenomenon wherein various kinds of sulphuric acid mist, produced through combustion of diesel fuel generally containing sulphurous substnces, fill up the valve chest 2 and also within the bonnet 12 as well by squeezing through the intermediate rubbing surface 8 of valve spindle 6 thereby corroding the compression spring 15 quickly, the present invention provides the valve with a ventilation opening 20 which can dissipate such sulphuric acid mist, which may otherwise fill up the interior of the bonnet 12, into the atmosphere thereby protecting the compression spring 15 from said corrosion.

Further, while the valve spindle is moving upward or downward as afore-mentioned, the valve chest 2 is at a time connected to both the fluid intake opening 3 and the exhaust hole 19 simultaneously, whereby the combustion gas is lead out to the atmosphere via the fluid intake opening 3, valve chest 2, draught chamber 18 and exhaust hole 19 in a quick scavenging action. This scavenging effect prevents, in particular, combustion residue from accumulating on the faces of main and additional valve seats 4, 16 or clogging various opening, channels, slits, etc..

As described in the foregoing, a pressure indicator in accordance with the present invention can obtain extremely reliable readings as measured data at each time of the measuring free from any influence thereupon by whatever pressure otherwise remaining in the valve; the valve self-protects against loosening or free-movement of the valve spindle and also against leaks, and therefore is usable with safety even under acutely changeable thermal conditions or vibrations; fitting or grinding action of the valve disk against the valve seat and scavenging action keeps the valve away from catching in combustion residues and accordingly from resultant leaks, the valve being well fit even for gas containing considerable combustion residues and/or solid powdery particles such as dust, thereby manifesting superior performance.

What is claimed is

1. A valve for a fluid pressure indicator device comprising:

A. a housing defining:

i. an axial core;

ii. an inner chamber in the intermediate portion of said core defining a lower valve seat and an upper valve seat;

iii. a fluid intake conduit interconnecting said lower valving seat and the bottom of said housing;
iv. a fluid outlet conduit interconnecting said chamber above said lower valve seat and a side of said housing;
v. an exhaust vent leading from said core above said upper valve seat through said housing to the atmosphere;

B. a threaded spindle reciprocably positioned in said core such that a lower valving portion reciprocating in said chamber is alternately contactable with said upper and lower valve seats;

C. a guide secured to the top of said housing and threadedly engaging the top of said spindle;

D. resilient means interposed between said guide and spindle so as to urge said spindle downwardly so as to close said lower valve seat.

2. A valve for a fluid pressure indicator device as in claim 1, said guide further including:
i. an outer bonnet secured to the top of said housing;
ii. an interiorly threaded spindle guide engaging the exterior threads of said spindle and including exterior upper and lower limiting shoulders alternately abutting, respectively, the interior top of said bonnet and the top of said housing;
iii. said resilient means being interposed between said lower shoulder and the interior top of said bonnet.

3. A valve for a fluid pressure indicator device as in claim 2, said spindle having a reduced diameter portion adjacent said lower valving portion so as to be out of contact with said valving portion as said lower valving portion is seated so as to vent said chamber and said fluid outlet via said exhaust vent as said housing is sealed from fluid intake.

* * * * *